United States Patent
Park et al.

(10) Patent No.: US 7,501,650 B2
(45) Date of Patent: Mar. 10, 2009

(54) P-TYPE SEMICONDUCTOR CARBON NANOTUBE USING HALOGEN ELEMENT AND FULLERENE OR ALKALI ELEMENT

(75) Inventors: Noe-jung Park, Suwon-si (KR); Sung-hoon Lee, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 243 days.

(21) Appl. No.: 11/202,185

(22) Filed: Aug. 12, 2005

(65) Prior Publication Data
US 2006/0067870 A1    Mar. 30, 2006

(30) Foreign Application Priority Data
Aug. 13, 2004    (KR) .............. 10-2004-0063765

(51) Int. Cl.
*H01L 29/10* (2006.01)
(52) U.S. Cl. .................. 257/44; 257/46; 257/104; 977/734; 977/742
(58) Field of Classification Search ........... 427/561, 427/430.1; 423/593.1; 257/40, 44, 46, 104; 977/734, 742
See application file for complete search history.

(56) References Cited

U.S. PATENT DOCUMENTS

| | | | |
|---|---|---|---|
| 5,493,577 A | 2/1996 | Choquette et al. | |
| 6,139,919 A * | 10/2000 | Eklund et al. | 427/430.1 |
| 6,217,843 B1 * | 4/2001 | Homyonfer et al. | 423/593.1 |
| 6,538,262 B1 * | 3/2003 | Crespi et al. | 257/40 |
| 6,723,624 B2 | 4/2004 | Wang et al. | |
| 6,797,336 B2 * | 9/2004 | Garvey et al. | 427/561 |
| 2002/0187403 A1 | 12/2002 | Hinokuma et al. | |
| 2004/0032892 A1 | 2/2004 | Muller | |
| 2004/0066820 A1 | 4/2004 | Johnson et al. | |

OTHER PUBLICATIONS

Korean Office Action dated Jan. 19, 2006.
E.W. Young et al., "Comparison of Wavelength Splitting for Selectively Oxidized, Ion Implanted, and Hybrid Vertical-Cavity Surface-Emitting Lasers", IEEE Journal of Quantum Electronics, vol. 39, No. 5, May 2003, pp. 634-639.
European Search Report dated Feb. 2, 2006.

* cited by examiner

*Primary Examiner*—Thanh Nguyen
(74) *Attorney, Agent, or Firm*—Buchanan Ingersoll & Rooney PC

(57) ABSTRACT

A p-type semiconductor carbon nanotube and a method of manufacturing the same are provided. The p-type semiconductor carbon nanotube includes a carbon nanotube; and a halogen element that is attached to an inner wall of the carbon nanotube and accepts electrons from the carbon nanotube to achieve p-type doping of the carbon nanotube. The p-type semiconductor carbon nanotube is stable at high temperatures and can maintain intrinsic good electrical conductivity of the carbon nanotube. The p-type semiconductor carbon nanotube can be relatively easily obtained using a conventional method of manufacturing a carbon nanotube, thereby significantly broadening the range of application of the carbon nanotube to electronic devices.

16 Claims, 7 Drawing Sheets

P-TYPE SEMICONDUCTOR CARBON NANOTUBE USING HALOGEN ELEMENT AND FULLERENE OR ALKALI ELEMENT

CROSS-REFERENCE TO RELATED PATENT APPLICATION

This application claims the benefit of Korean Patent Application No. 10-2004-0063765, filed on Aug. 13, 2004, in the Korean Intellectual Property Office, the disclosure of which is incorporated herein in its entirety by reference.

BACKGROUND OF THE INVENTION

1. Field of the Invention

The present invention relates to a p-type semiconductor carbon nanotube, and more particularly, to a p-type carbon nanotube in which a halogen element is injected into a carbon nanotube to achieve hole-doping and a method of manufacturing the same.

2. Description of the Related Art

Carbon nanotubes were first discovered in 1991, and have been studied for use as micro electro mechanical system (MEMS) devices because of their good mechanical and chemical properties, their ability to have a very long cylindrical form with a diameter of several nanometers or tens of nanometers and a length of a micrometer and their good electrical conductivity. Studies for utilizing carbon nanotubes in various devices are being actively performed. Currently, carbon nanotubes are utilized in field emission devices, optical switches in the optical communication field, and in bio devices.

Carbon nanotubes are manufactured using arc discharge, laser deposition, chemical vapor deposition using a catalyst or screen printing, and methods for manufacturing carbon nanotubes are now well known.

Carbon nanotubes are p-type or n-type in order to be used as semiconductor devices such as complementary metal-oxide-semiconductor (CMOS) devices. It had been alleged that in most carbon nanotubes exposed to air, hole-doping (p-type doping) occurs due to the presence of oxygen, but it has been proven that oxygen in air does not cause hole-doping.

FIG. 1 is a cross-sectional view of an electronic device including n-type (electron-doped) carbon nanotubes disclosed in U.S. Pat. No. 6,723,624. To form the electronic device, a gate electrode 20 is formed on a substrate 10 and an oxide layer 11 is formed thereon. Thereafter, a first patterned metal layer 12 is formed on the oxide layer 11 and a carbon nanotube layer 13 is formed on the oxide layer 11 so as to correspond to the gate electrode 20. A gate layer 14 is then formed on the first metal layer 12 and the carbon nanotube layer 13. Such a method of manufacturing an n-type carbon nanotube is relatively well known.

A method of manufacturing a p-type carbon nanotube by depositing iodine or $FeCl_3$, etc. on an outer wall of a conventional carbon nanotube is known. However, such a structure is unstable at high temperatures and leads to a change in the electron structure of the carbon nanotube. A method for manufacturing a stable p-type carbon nanotube is not yet known.

SUMMARY OF THE INVENTION

The present invention provides a p-type semiconductor carbon nanotube which has stable properties at high temperatures, can form a logic circuit in combination with a conventional n-type semiconductor carbon nanotube and can be easily manufactured, and a method of manufacturing the same.

According to an aspect of the present invention, there is provided a p-type semiconductor carbon nanotube including: a carbon nanotube; and a halogen element that is attached to an inner wall of the carbon nanotube and accepts electrons from the carbon nanotube to achieve p-type doping of the carbon nanotube.

The p-type semiconductor carbon nanotube may further include fullerene attached to the inner wall of the carbon nanotube.

The halogen element may be bromine or iodine.

The fullerene may be selected from materials having molecular structures composed of 60 carbon atoms (C60), 70 carbon atoms (C70), 76 carbon atoms (C76), and 84 carbon atoms (C84).

According to another aspect of the present invention, there is provided a method of manufacturing a p-type semiconductor carbon nanotube, the method including: preparing a specimen including a carbon nanotube; supplying halogen gas to the specimen including the carbon nanotube; and injecting halogen gas into the carbon nanotube by heating the specimen including the carbon nanotube.

In the method, fullerene gas is supplied with the halogen gas and is injected into the carbon nanotube.

In the method, electrons migrate from the carbon nanotube to the injected halogen gas to dissociate the halogen gas and p-type doping of the carbon nanotube is achieved.

According to another aspect of the present invention, there is provided a p-n junction semiconductor carbon nanotube including: a carbon nanotube; a halogen element that is attached to an inner wall of the carbon nanotube and accepts electrons from the carbon nanotube to achieve p-type doping of the carbon nanotube; and an alkali element that is attached to the inner wall of the carbon nanotube and provides the carbon nanotube with electrons to achieve n-type doping of the carbon nanotube.

According to another aspect of the present invention, there is provided a p-n junction semiconductor carbon nanotube including: a first carbon nanotube; a halogen element that is attached to an inner wall of the first carbon nanotube and accepts electrons from the first carbon nanotube to achieve p-type doping of the first carbon nanotube; a second carbon nanotube disposed so as to cross the first carbon nanotube; and an alkali element that is attached to the inner wall of the second carbon nanotube and provides the second carbon nanotube with electrons to achieve n-type doping of the second carbon nanotube.

In the p-n junction semiconductor carbon nanotube, the first carbon nanotube and the second carbon nanotube cross each other and do not contact each other.

BRIEF DESCRIPTION OF THE DRAWINGS

The above and other features and advantages will become more apparent by describing in detail exemplary embodiments with reference to the attached drawings in which.

DETAILED DESCRIPTION OF THE INVENTION

The present invention will now be described more fully with reference to the accompanying drawings, in which exemplary embodiments of the invention are shown.

Figure 1:
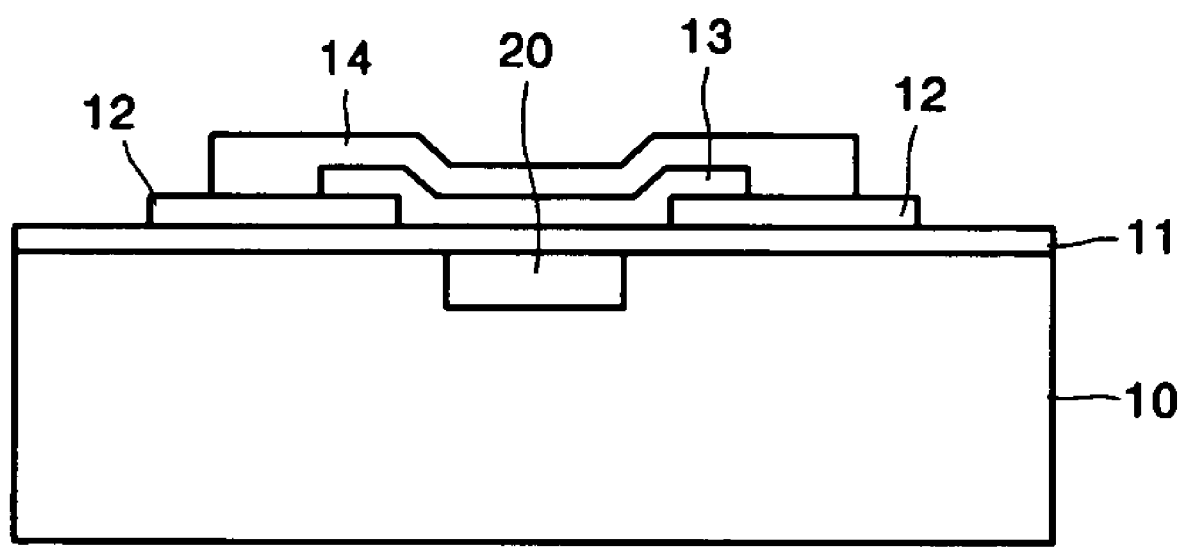
FIG. 1 is a cross-sectional view of a semiconductor device using conventional carbon nanotubes.
Figure 2A:
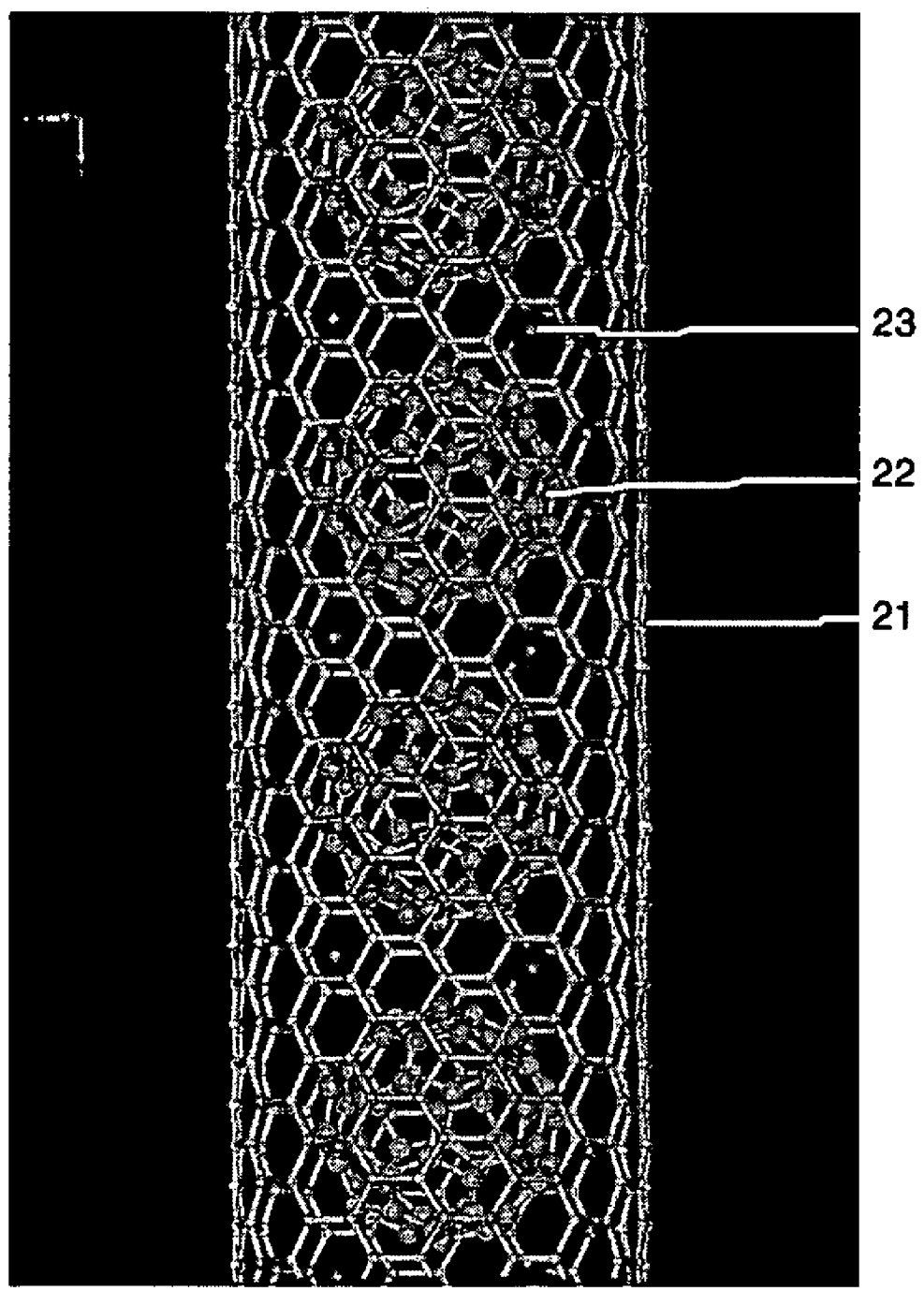
FIG. 2A is a diagram of a p-type semiconductor carbon nanotube according to an embodiment of the present invention.
Figure 2B:
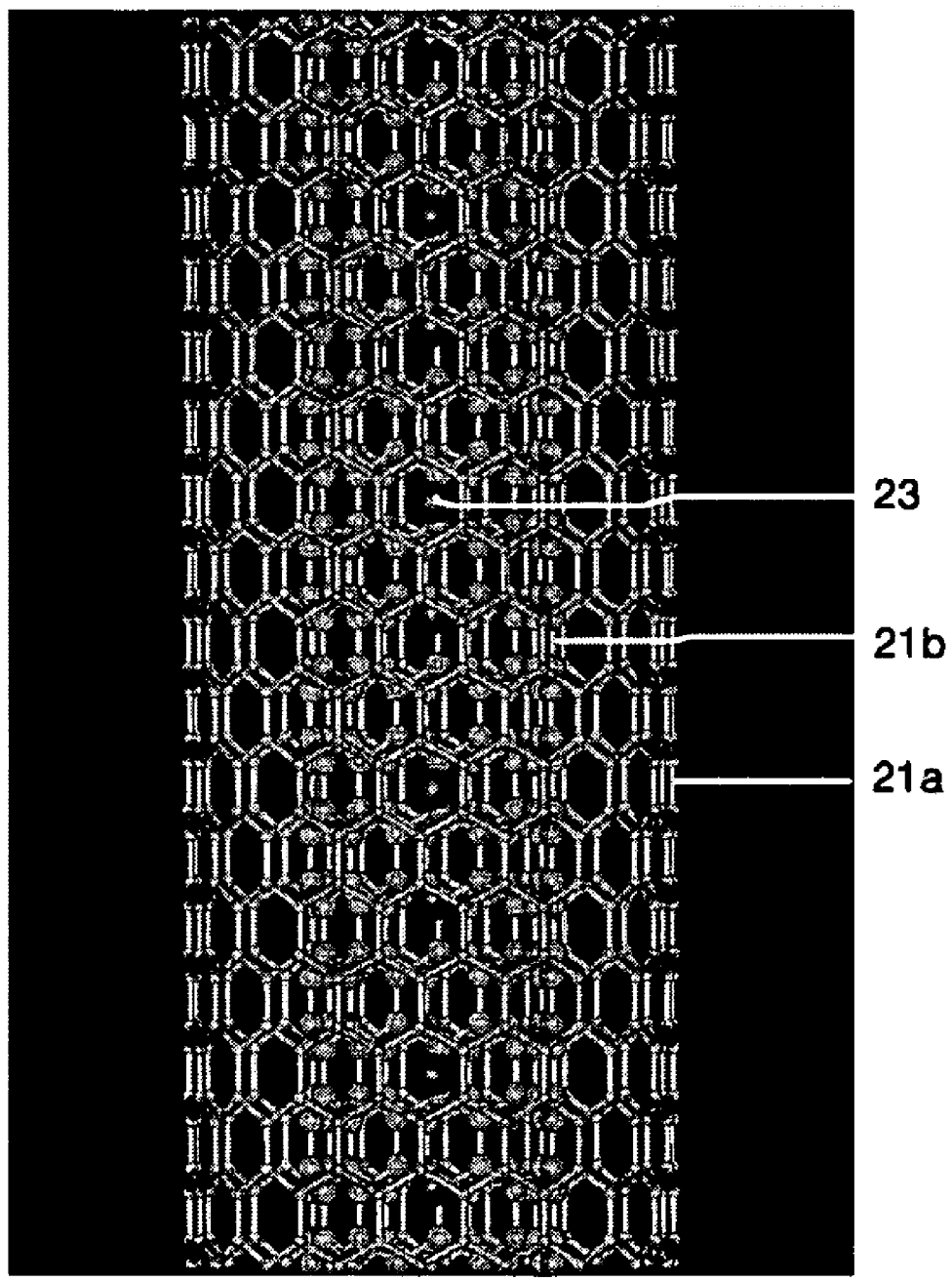
FIG. 2B is a diagram of a p-type semiconductor carbon nanotube according to another embodiment of the present invention.

FIGS. 2A and 2B illustrate p-type semiconductor carbon nanotubes according to embodiments of the present invention.

Referring to FIG. 2A, the p-type semiconductor carbon nanotube has a halogen element 23 attached to the inner wall of a carbon nanotube 21. A fullerene 22 is included in the carbon nanotube 21.

The carbon nanotube 21 may be a general carbon nanotube formed using a conventional method. Specifically, the carbon nanotube 21 can be formed by arc discharge, laser deposition, chemical vapor deposition using a catalyst or screen printing.

In the present embodiment, to achieve p-type doping (hole-doping), the halogen element 23 is attached to the inner wall of the carbon nanotube 21. To inject the halogen element 23 into the carbon nanotube 21, the fullerene 22 is injected with the halogen element 23. The fullerene 22 is composed of 60 carbon atoms (C60), 70 carbon atoms (C70), 76 carbon atoms (C76) or 84 carbon atoms (C84). The fullerene 22 is spherical or has a cage structure and can confine very small materials and is strong and slippery. Also, the fullerene 22 can be opened so as to include other materials and be linked to each other to form a tube.

The fullerene 22 can be selectively used according to the inner diameter of the carbon nanotube 21. According to an experiment performed by the inventor, when the inner diameter of the carbon nanotube 21 is less than about 9 Å, the halogen element 23 can be easily injected into the carbon nanotube 21 without the fullerene 22, and when the inner diameter of the carbon nanotube 21 is not less than about 9 Å, it is preferable to inject the halogen element 23 with the fullerene 22.

A conventional carbon nanotube generally has a single wall as illustrated in FIG. 2A, but may have a double wall as illustrated in FIG. 2B or a multiwall. Referring to FIG. 2B, when the inner diameter of a double carbon nanotube composed of an outer carbon nanotube 21a and an inner carbon nanotube 21b is less than 9 Å, the halogen element 23 can be easily injected into the carbon nanotube 21 without the fullerene 22. However, when the inner diameter of the double carbon nanotube is greater than 9 Å, it is preferable to inject the halogen element 23 with the fullerene 22. Generally, most carbon nanotubes have an inner diameter greater than 9 Å, and thus it is often that the halogen element 23 is injected with the fullerene 22.

Figure 3A:
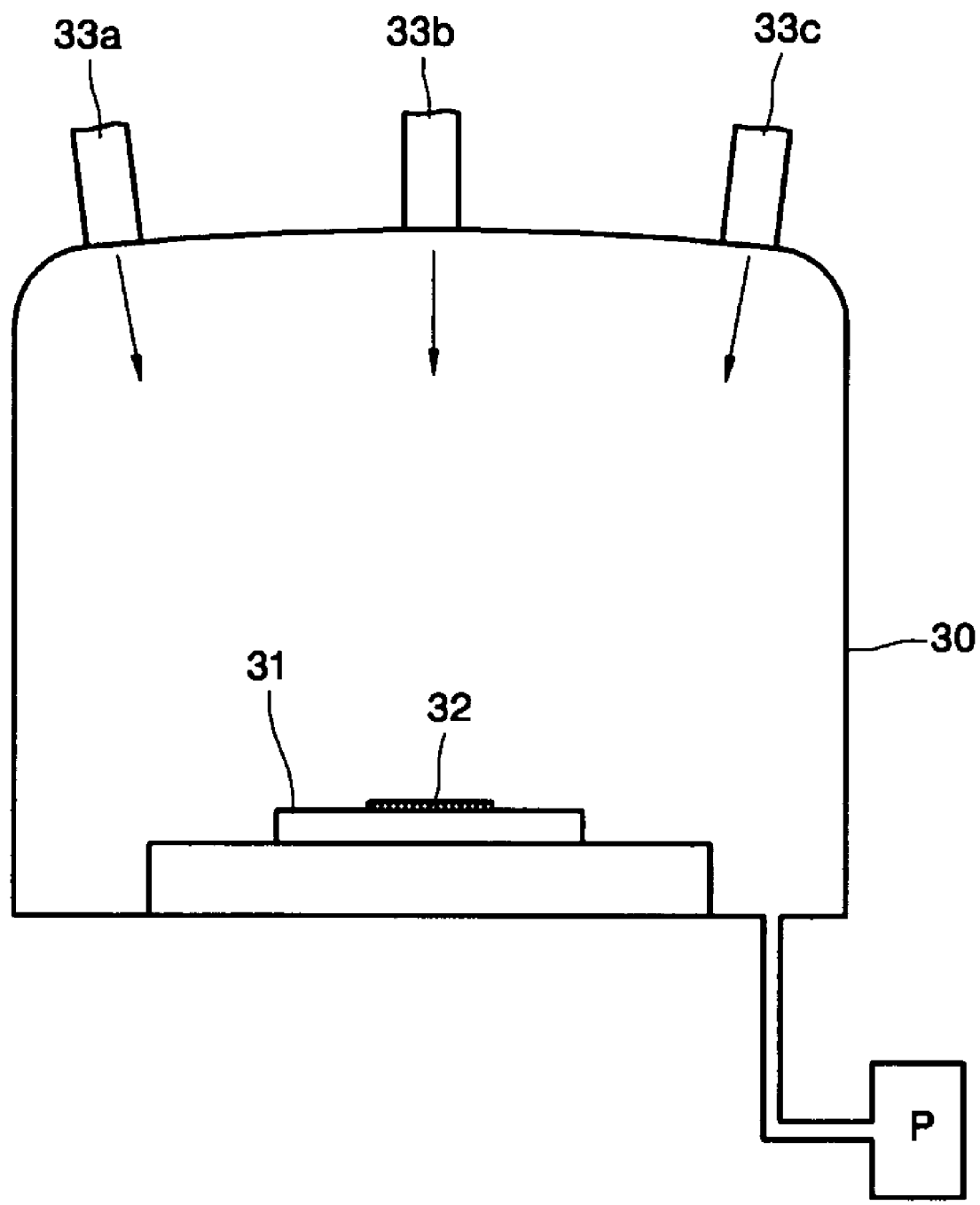
FIG. 3A is a schematic diagram of an apparatus for manufacturing a p-type semiconductor carbon nanotube according to an embodiment of the present invention.

FIG. 3A is a schematic diagram of an apparatus for manufacturing the p-type semiconductor carbon nanotube according to an embodiment of the present invention. Referring to FIG. 3A, a chamber 30 includes a specimen fixing portion 31 on which a specimen 32 is placed. The specimen 32 may be a carbon nanotube manufactured using a conventional method or a semiconductor device including a carbon nanotube.

A method of manufacturing the p-type semiconductor carbon nanotube according to an embodiment of the present invention will now be described in more detail. In an exemplary embodiment, a halogen is injected together with a fullerene. However, when the inner diameter of the carbon nanotube is less than 9 Å, a process of injecting fullerene is omitted.

First, a carbon nanotube or the specimen 32 including a carbon nanotube is placed on the specimen fixing portion 31. The chamber 30 purges impurities with a vacuum pump (P).

Then, halogen gas and fullerene gas are injected through gas supplying inlets 33a, 33b and 33c. Bromine gas ($Br_2$) or iodine gas can be used as the halogen gas. The fullerene gas contains carbon molecules in the form of C60, C70, C76 or C84 as described above, and C60 is often used. Amounts of the halogen gas and the fullerene gas injected can be adjusted and are not particularly critical.

Next, the internal temperature of the chamber 30 is raised through a temperature controller (not shown). The chamber is heated to about 300 to 600° C. At this time, the fullerene gas is injected into the carbon nanotube. However, when the inner diameter of the carbon nanotube is large, the temperature is not an important variable. Thus, the halogen gas, such as bromine, and the fullerene gas are injected into the carbon nanotube. When the halogen gas such as bromine is injected into the carbon nanotube, for example, a bromine molecule accepts two electrons from the carbon nanotube and decomposes into two bromine atoms as illustrated in Formula 1.

$$Br_2 + 2e^- \rightarrow 2Br^- \quad \text{Formula 1}$$

Figure 3B:
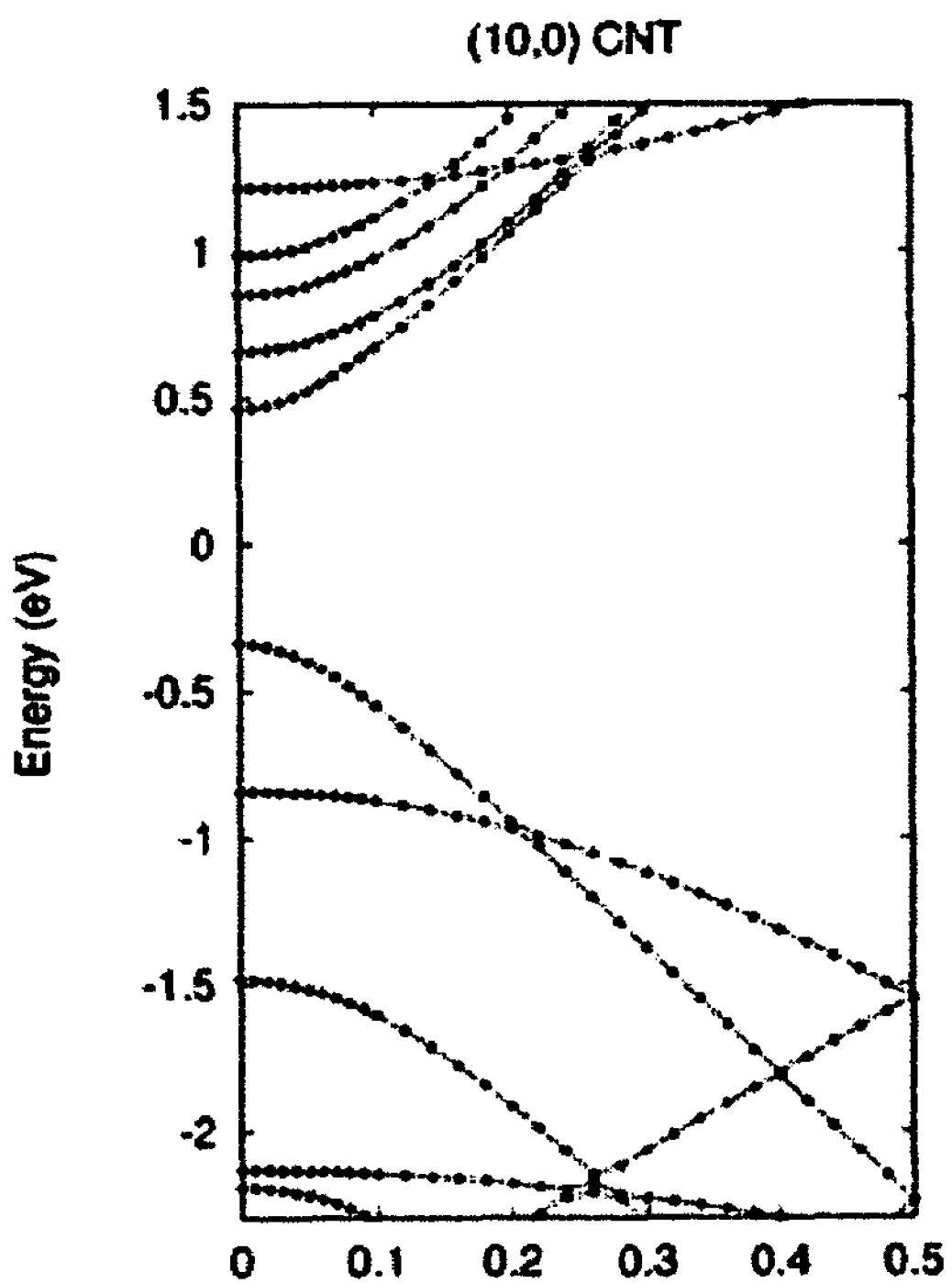
FIG. 3B is a graph illustrating the energy level of a conventional carbon nanotube alone.
Figure 3C:
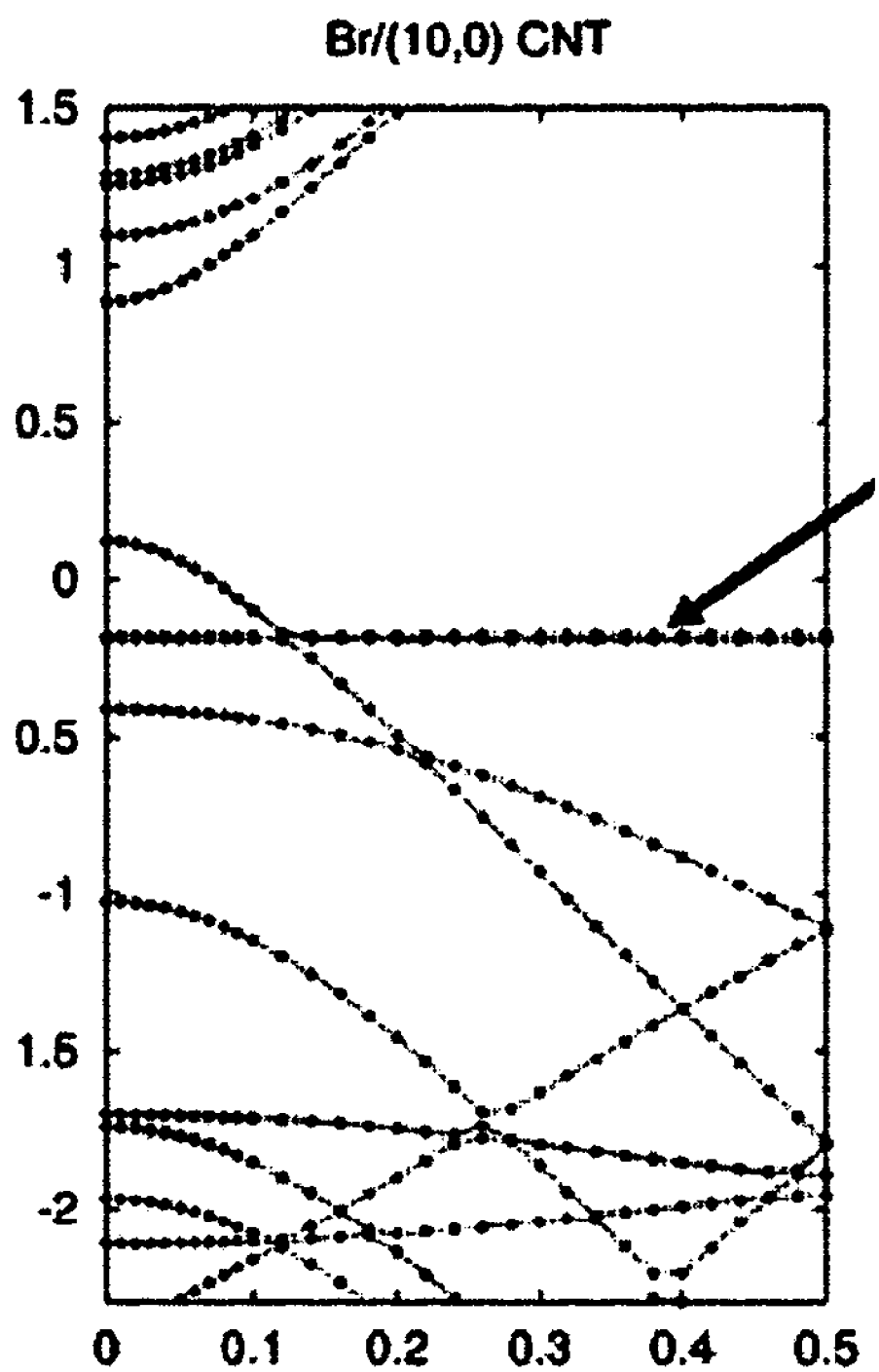
FIG. 3C is a graph illustrating energy level of a carbon nanotube having bromine atoms attached thereto according to an embodiment of the present invention.

In Formula 1, 2 electrons are supplied from the carbon nanotube and are accepted by the bromine molecule to produce holes in the carbon nanotube. Consequently, p-type doping of the carbon nanotube, i.e. hole-doping, is achieved. FIG. 3B is a graph illustrating the energy level of the carbon nanotube alone. FIG. 3C is a graph illustrating the energy level of the carbon nanotube with bromine atoms attached thereto. Referring to FIGS. 3B and 3C, the energy level of the carbon nanotube is shifted upward by the attachment of bromine atoms and the fermi level (designated by an arrow) overlaps the upper portion of the valence band. That is, electrons are emitted from the carbon nanotube and p-type doping of the carbon nanotube is achieved.

A method of forming a p-n junction semiconductor carbon nanotube using the p-type semiconductor carbon nanotube formed as described above will now be described in detail.

Figure 4A:
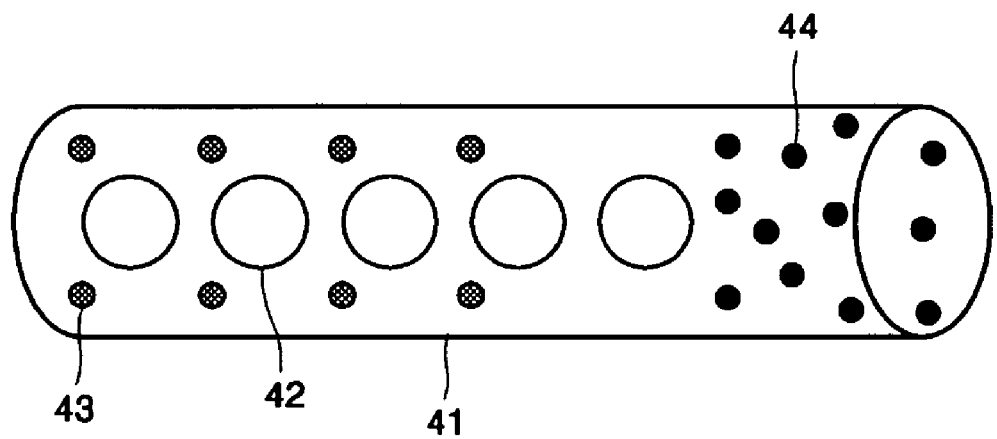
FIG. 4A is a diagram of a p-n junction semiconductor carbon nanotube according to an embodiment of the present invention.

FIG. 4A is a diagram of a p-n junction semiconductor carbon nanotube according to an embodiment of the present invention. Referring to FIG. 4A, the p-n junction semiconductor carbon nanotube includes a fullerene 42, a halogen element 43 and an alkali element 44 contained in a carbon nanotube 41. The alkali element 44, such as Na, K or Cs, is a monovalent element having one electron in its outermost electron orbital, and when the alkali element 44 is injected into the carbon nanotube 41, the valence electron migrates to the carbon nanotube 41 due to the reaction $K \rightarrow K^+ + e^-$. That is, n-type doping (electron doping) of the carbon nanotube 41 is achieved. Thus, after p-type doping of the carbon nanotube 41 by the halogen element 43, the alkali element 44, such as K, Na or Cs, is injected into the carbon nanotube 41 to achieve n-type doping, thereby forming the p-n junction carbon nanotube illustrated in FIG. 4A.

Figure 4B:
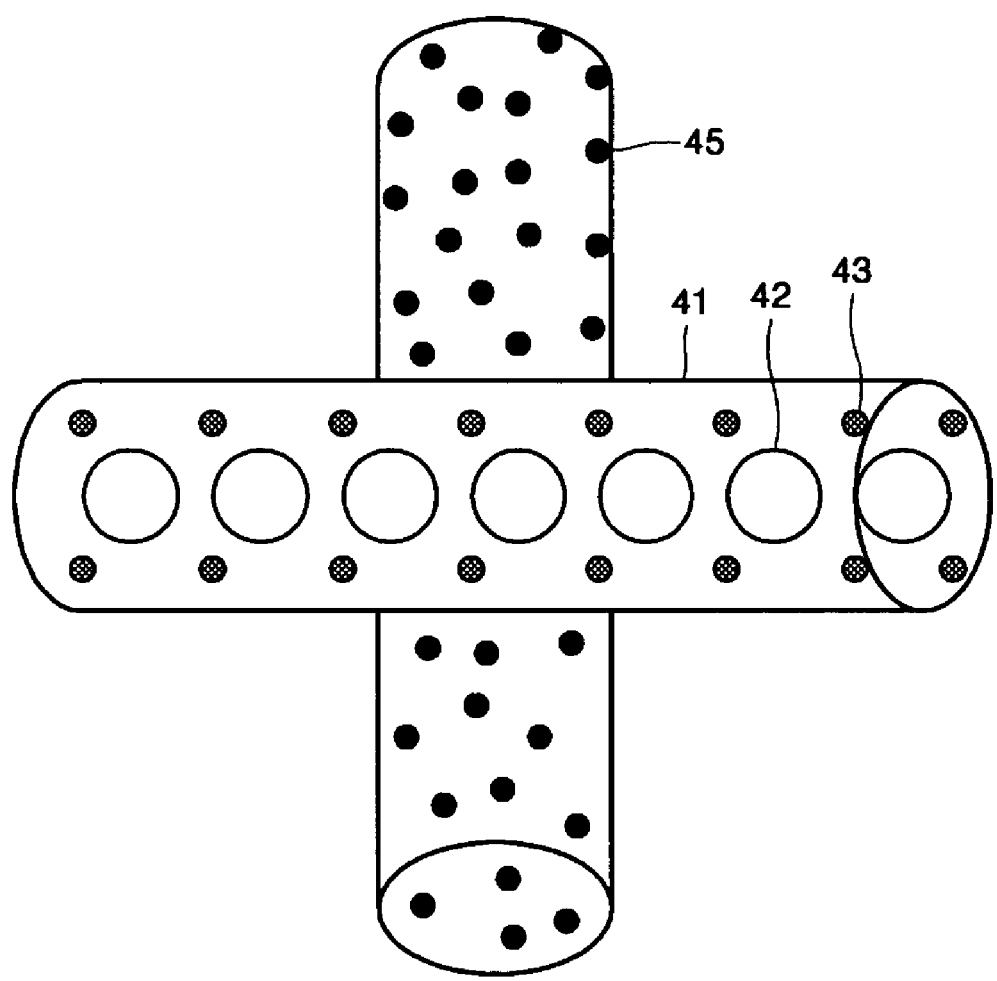
FIG. 4B is a diagram of a p-n junction semiconductor carbon nanotube according to another embodiment of the present invention.

Since the p-n junction carbon nanotube having the structure of FIG. 4A should be manufactured by performing the p-type doping and the n-type doping at different sections in a carbon nanotube, the process should be very precisely performed. Unlike the structure of FIG. 4A, the p-n type junction semiconductor carbon nanotube having the structure of FIG. 4B is manufactured by crossing a p-type semiconductor carbon nanotube and an n-type semiconductor carbon nanotube. The p-type semiconductor carbon nanotube can be formed according to embodiments of the present invention and the n-type semiconductor carbon nanotube can be formed according to a conventional method or by injecting an alkali element 45 into the carbon nanotube 41. It is noted that the p-type semiconductor carbon nanotube and the n-type semiconductor carbon nanotube cross each other without contacting each other. As illustrated in FIG. 4B, the p-type carbon nanotube includes a fullerene 42 and a halogen element 43. When the p-type semiconductor carbon nanotube and the n-type semiconductor carbon nanotube are formed as described above, the p-n junction semiconductor carbon nanotube and a logic circuit can be obtained.

According to the present invention, a carbon nanotube is stable at high temperatures and can maintain its intrinsic good electrical conductivity. The p-type carbon nanotube proposed in the present invention can be relatively easily obtained using a conventional method of manufacturing a carbon nanotube. A general doping method can be applied to each nanotube to significantly broaden the range of application of the carbon nanotube.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A p-type semiconductor carbon nanotube comprising:
a carbon nanotube;
a halogen element that is attached to an inner wall of the carbon nanotube and accepts electrons from the carbon nanotube to achieve p-type doping of the carbon nanotube; and
fullerene attached to the inner wall of the carbon nanotube.

2. The p-type semiconductor carbon nanotube of claim 1, wherein the halogen element is bromine or iodine.

3. The p-type semiconductor carbon nanotube of claim 1, wherein the fullerene is selected from the group consisting of materials having molecular structures composed of 60 carbon atoms (C60), 70 carbon atoms (C70), 76 carbon atoms (C76) and 84 carbon atoms (C84).

4. The p-type semiconductor carbon nanotube of claim 1, wherein the halogen element and the fullerene are injected into the carbon nanotube together from halogen gas and fullerene gas.

5. The p-type semiconductor carbon nanotube of claim 4, wherein the fullerene is selected from the group consisting of materials having molecular structures composed of 60 carbon atoms (C60), 70 carbon atoms (C70), 76 carbon atoms (C76) and 84 carbon atoms (C84).

6. A p-n junction semiconductor carbon nanotube comprising:
a carbon nanotube;
a halogen element that is attached to an inner wall of the carbon nanotube and accepts electrons from the carbon nanotube to achieve p-type doping of the carbon nanotube; and
an alkali element that is attached to the inner wall of the carbon nanotube and provides the carbon nanotube with electrons to achieve n-type doping of the carbon nanotube.

7. The p-n junction semiconductor carbon nanotube of claim 6, wherein the alkali element is at least one element selected from the group consisting of Na, K and Cs.

8. The p-n junction semiconductor carbon nanotube of claim 6, further comprising fullerene attached to the inner wall of the carbon nanotube.

9. The p-type semiconductor carbon nanotube of claim 8, wherein the p-type semiconductor carbon nanotube is electrically semiconductive, and wherein the p-type doping occurs by injecting halogen gas into the carbon nanotube by supplying halogen gas with fullerene gas and heating a specimen including the carbon nanotube.

10. The p-n junction semiconductor nanotube of claim 6, wherein the halogen element is attached to the inner wall of the carbon nanotube by injecting the halogen element into the carbon nanotube by supplying a halogen gas and heating a specimen including the carbon nanotube, and the alkali element is attached to the inner wall of the carbon nanotube by injecting the alkali element into the carbon nanotube by supplying an alkali gas and heating a specimen including the carbon nanotube.

11. A p-n junction semiconductor carbon nanotube comprising:
a first carbon nanotube;
a halogen element that is attached to an inner wall of the first carbon nanotube and accepts electrons from the first carbon nanotube to achieve p-type doping of the first carbon nanotube;
a second carbon nanotube disposed so as to cross the first carbon nanotube; and
an alkali element that is attached to the inner wall of the second carbon nanotube and provides the second carbon nanotube with electrons to achieve n-type doping of the second carbon nanotube.

12. The p-n junction semiconductor carbon nanotube of claim 11, wherein the alkali element is at least one element selected from the group consisting of Na, K and Cs.

13. The p-n junction semiconductor carbon nanotube of claim 11, further comprising fullerene attached to the inner wall of the first carbon nanotube.

14. The p-n junction semiconductor carbon nanotube of claim 11, wherein the first carbon nanotube and the second carbon nanotube cross each other and do not contact each other.

15. The p-type semiconductor carbon nanotube of claim 11, wherein the p-type semiconductor carbon nanotube is electrically semiconductive, and wherein the p-type doping occurs by injecting halogen gas into the carbon nanotube by supplying halogen gas with fullerene gas and heating a specimen including the carbon nanotube.

16. A p-type semiconductor carbon nanotube comprising:
a carbon nanotube; and
a halogen element that is attached to an inner wall of the carbon nanotube and accepts electrons from the carbon nanotube to achieve p-type doping of the carbon nanotube,
wherein the p-type semiconductor carbon nanotube is electrically semiconductive, and wherein the p-type doping occurs by injecting halogen gas into the carbon nanotube by supplying halogen gas with fullerene gas and heating a specimen including the carbon nanotube.

* * * * *